US012159740B2

(12) United States Patent
Kuo et al.

(10) Patent No.: US 12,159,740 B2
(45) Date of Patent: Dec. 3, 2024

(54) INDUCTOR STRUCTURE HAVING VERTICAL COIL WITH SYMMETRICAL PINS

(71) Applicant: ITG Electronics, Inc., New Taipei (TW)

(72) Inventors: Martin Kuo, New Taipei (TW); Nanhai Zhu, New Taipei (TW)

(73) Assignee: ITG Electronics, Inc., New Taipei (TW)

( * ) Notice: Subject to any disclaimer, the term of this patent is extended or adjusted under 35 U.S.C. 154(b) by 721 days.

(21) Appl. No.: 17/210,679

(22) Filed: Mar. 24, 2021

(65) Prior Publication Data

US 2022/0310306 A1 Sep. 29, 2022

(51) Int. Cl.
*H01F 27/29* (2006.01)
*H01F 27/24* (2006.01)

(52) U.S. Cl.
CPC ............. *H01F 27/29* (2013.01); *H01F 27/24* (2013.01)

(58) Field of Classification Search
CPC . H01F 27/29; H01F 27/24; H01F 3/10; H01F 17/04; H01F 27/292; H01F 3/14
See application file for complete search history.

(56) References Cited

U.S. PATENT DOCUMENTS

2014/0068926 A1* 3/2014 Saito ..................... H01F 41/127 29/602.1

FOREIGN PATENT DOCUMENTS

CN 205230745 U * 5/2016
JP 2013183052 A * 9/2013 ........... H01F 27/022
WO WO-2012105489 A1 * 8/2012 ............. H01F 17/04

* cited by examiner

*Primary Examiner* — Tuyen T Nguyen
(74) *Attorney, Agent, or Firm* — Li & Cai Intellectual Property (USA) Office

(57) ABSTRACT

An inductor structure having a vertical coil with symmetrical pins is provided. The inductor structure includes a first magnetic core body, a second magnetic core body, and a coil body. An accommodation space is defined between the second magnetic core body and the first magnetic core body. The coil body is located in the accommodation space. The coil body includes a main body part, a first pin part, and a second pin part that are combined into an integrated and homogeneous single component. One end and another end of main body part are misaligned from each other, and the first pin part and the second pin part are symmetrically disposed facing each other.

9 Claims, 9 Drawing Sheets

INDUCTOR STRUCTURE HAVING VERTICAL COIL WITH SYMMETRICAL PINS

FIELD OF THE DISCLOSURE

The present disclosure relates to an inductor structure, and more particularly to an inductor structure having a vertical coil with symmetrical pins.

BACKGTOROIDAL OF THE DISCLOSURE

Inductors generally have two types: a horizontal type (or referred to as lying-down type) and a standing type, in which the horizontal inductor has such an advantage that pins at the two ends of a coil are still collinear although the coil has multiple loops. However, the horizontal inductor occupies most of the surface area of the substrate, affecting surface layout of the substrate. The standing inductor, on the contrary, occupies a small surface area of the substrate and facilitates surface layout of the substrate. However, the pins at the two ends of the coil in the standing inductor are misaligned (diagonally arranged) and far apart, adversely affecting mounting and design of the standing inductor.

SUMMARY OF THE DISCLOSURE

In view of the shortcomings in the prior art, the technical problem to be solved by the present disclosure is to provide an inductor structure having a vertical coil with symmetrical pins.

To solve the foregoing technical problem, one technical solution adopted by the present disclosure is to provide an inductor structure having a vertical coil with symmetrical pins, which includes a first magnetic core body, a second magnetic core body, and a coil body. The second magnetic core body is detachably connected to the first magnetic core body, and an accommodation space is defined between the second magnetic core body and the first magnetic core body. The coil body is located in the accommodation space and includes a main body part, a first pin part, and a second pin part, where the first pin part is connected to one end of the main body part; the second pin part is connected to the other end of the main body part; and the main body part, the first pin part, and the second pin part combine into a single component. The one end and the other end of main body part are misaligned, and the first pin part and the second pin part are symmetrically arranged and face each other.

One of advantageous effects of the present disclosure lies in that, practicality of the inductor structure having a vertical coil with symmetrical pins provided by the present disclosure can be improved by using the foregoing technical solution.

DETAILED DESCRIPTION OF THE EXEMPLARY EMBODIMENTS

Figure 1:
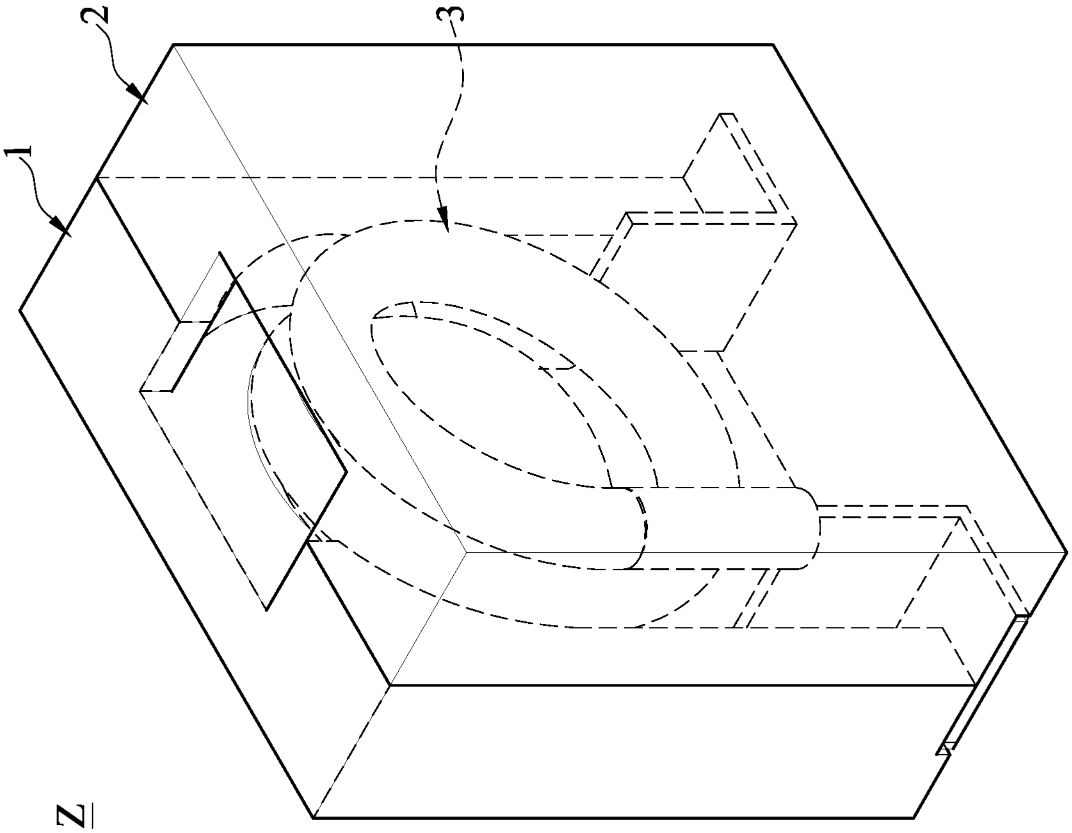
FIG. 1 is a schematic three-dimensional diagram of an inductor structure having a vertical coil with symmetrical pins in a first embodiment of the present disclosure.
Figure 2:
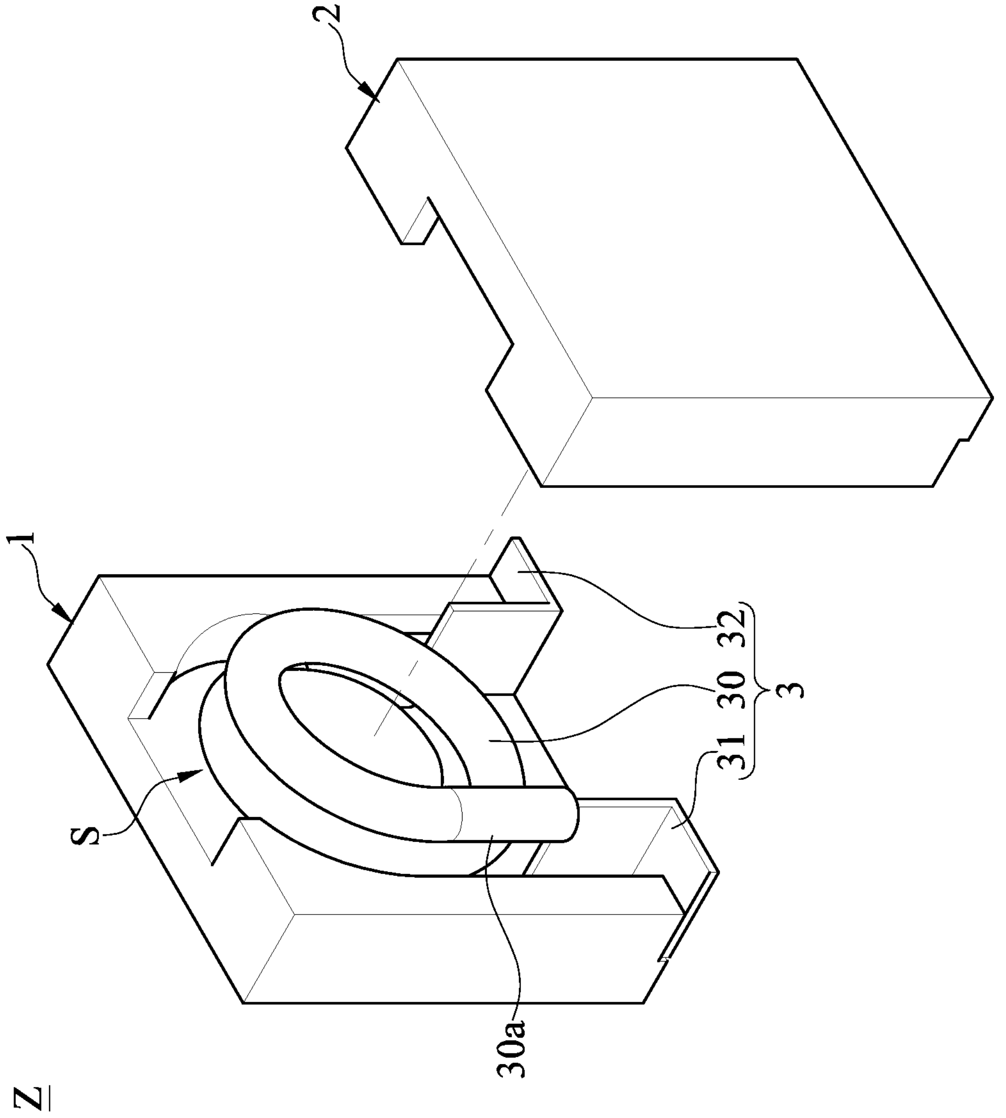
FIG. 2 is a schematic partial exploded diagram of the inductor structure having a vertical coil with symmetrical pins in the first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The following describes an implementation manner of the present disclosure relating to an "inductor structure having a vertical coil with symmetrical pins" through specific embodiments. Those skilled in the art can easily understand the advantages and effects of the present disclosure from the content disclosed in the specification. The present disclosure can be embodied or applied through other different embodiments. Based on different opinions and applications, the details in the present specification can also be modified and changed without departing from the concept of the present disclosure. In addition, it should be stated first that the accompanying drawings of the present disclosure are merely for brief illustration and not drawn according to actual dimensions. The following embodiments will further explain the related technical content of the present disclosure, but the disclosed content is not intended to limit the technical scope of the present disclosure.

It should be understood that, although the terms "first", "second", "third", and the like are probably used herein to describe elements or signals, these elements or signals should not be limited by these terms. The use of these terms only aims to distinguish one element from another, or one signal from another. In addition, the term "or" as used herein shall, according to the actual situation, include any one or a combination of more of the associated listed items.

Refer to FIGS. 1 to 6, which are respectively a schematic three-dimensional diagram, a schematic partial exploded diagram, a schematic exploded diagram, a first schematic bottom view, a schematic diagram of a first magnetic core body, and a second schematic bottom view of an inductor structure having a vertical coil with symmetrical pins in a first embodiment of the present disclosure. As shown in the figures, the inductor structure Z having a vertical coil with symmetrical pins provided by the first embodiment of the present disclosure includes a first magnetic core body 1, a second magnetic core body 2, and a coil body 3.

First, referring to FIGS. 1 to 4, the first magnetic core body 1 and the second magnetic core body 2 may be symmetrical structures; and may be made of ferrite or a soft magnetic material, but the present disclosure is not limited thereto. The first magnetic core body 1 is detachably connected to the second magnetic core body 2. An accommodation space S is formed between the first magnetic core body 1 and the second magnetic core body 2, and is used to accommodate the coil body 3.

Further, referring to FIGS. 1 to 4, the first magnetic core body 1 is provided with a first notch 10 communicating with the accommodation space S at one end, and the second magnetic core body 2 is provided with a second notch 20 corresponding to the first notch 10 at one end. The first magnetic core body 1 is provided with a first opening 11 communicating with the accommodation space S at the other end, and the second magnetic core body 2 is provided with a second opening 21 corresponding to the first opening 11 at the other end. That is to say, the first notch 10 and the second notch 20 are combined to form a hole in the top of the inductor structure Z, and the first opening 11 and the second opening 21 are combined to form an opening in the bottom of the inductor structure Z.

Afterwards, referring to FIGS. 1 to 4, the coil body 3 may be a convoluted toroidal or flat coil, but the present disclosure is not limited thereto. The coil body 3 may include a main body part 30, a first pin part 31, and a second pin part 32. The main body part 30 may have one end **30*a* and the other end 30*b* which are misaligned. The first pin part 31 is connected to the one end 30*a* of the main body part 30, and the second pin part 32 is connected to the other end 30*b* of the main body part 30. The main body part 30, the first pin part 31, and the second pin part 32 combine into an integrated and homogeneous single component. Further, the pins at the two ends of the coil body 3 may be pressed, bent, or subjected to other industrial processing techniques to separately extend towards a lateral side, to form an approximately L-shaped first pin part 31 and second pin part 32. The body part that is not subjected to the forgoing industrial processing technique forms the main body part 30 which may also be a convoluted toroidal or flat coil, but the present disclosure is not limited thereto. Moreover, the first pin part 31 and the second pin part 32 may be symmetrical about the main body part 30 and aligned with each other. In addition, the first pin part 31 and the second pin part 32 face each other with respect to the main body part 30. For example, referring to FIG. 4, a distance between one side 312 of the first pin part 31 and the second opening 21 is equal to that between one side 322 of the second pin part 32 and the second opening 21. Correspondingly, a distance between the other side 313 of the first pin part 31 and the second opening 21 is equal to that between the other side 322 of the second pin part 32 and the second opening 21. In addition, the first pin part 31 and the second pin part 32 may be partially exposed out of the first opening 11 and the second opening 21**.

Further, referring to FIGS. 1 to 4, a top portion 310 of the first pin part 31 may have a first position **310*a* close to the first magnetic core body 1 and a second position 310*b* close to the second magnetic core body 2; and a top portion 320 of the second pin part 32 may have a third position 320*a* close to the first magnetic core body 1 and a fourth position 320*b* close to the second magnetic core body 2. The one end 30*a* of the main body part 30 is connected to the second position 310*b* on the top portion 310 of the first pin part 31, and the other end 30*b* of the main body part 30 is connected to the fourth position 320*b* on the top portion 320 of the second pin part 32. In addition, a bottom portion 311 of the first pin part 31 and a bottom portion 321 of the second pin part 32 are exposed out of the first opening 11 and the second opening 21**.

To sum up, by using the foregoing technical solution, the inductor structure Z having a vertical coil with symmetrical pins provided by the present disclosure occupies a small surface area of a substrate and thus facilitates surface layout of the substrate (for example, a circuit board, but the present disclosure is not limited thereto) as compared with the existing horizontal inductor. Moreover, because the first pin part 31 and the second pin part 32 in the present disclosure are symmetrical about the main body part 30, aligned with each other, and face each other with respect to the main body part 30, the inductor structure Z having a vertical coil with symmetrical pins in the present disclosure is easily mounted and disposed on the substrate as compared with the existing standing inductor.

Figure 3:
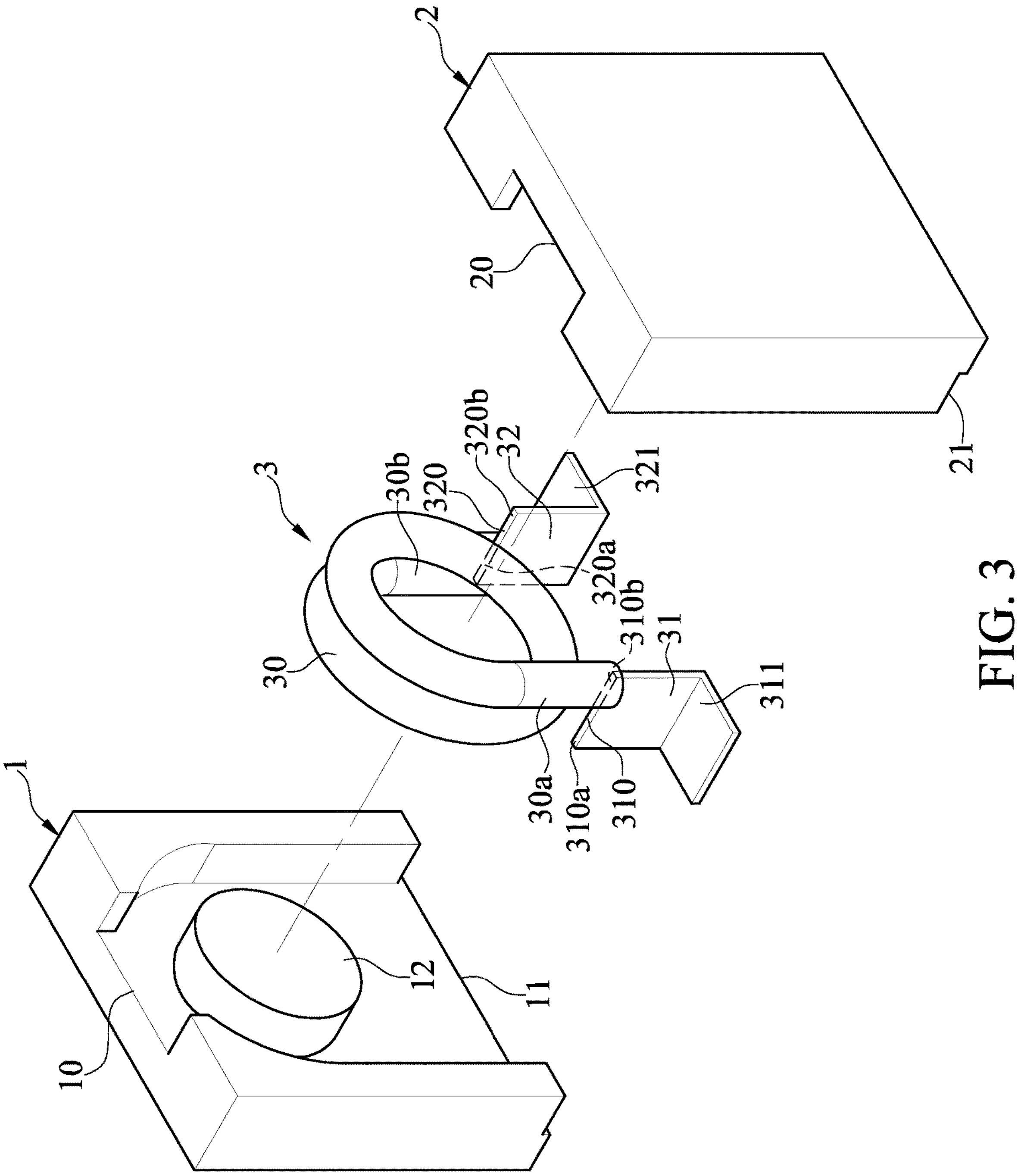
FIG. 3 is a schematic exploded diagram of the inductor structure having a vertical coil with symmetrical pins in the first embodiment of the present disclosure.
Figure 4:
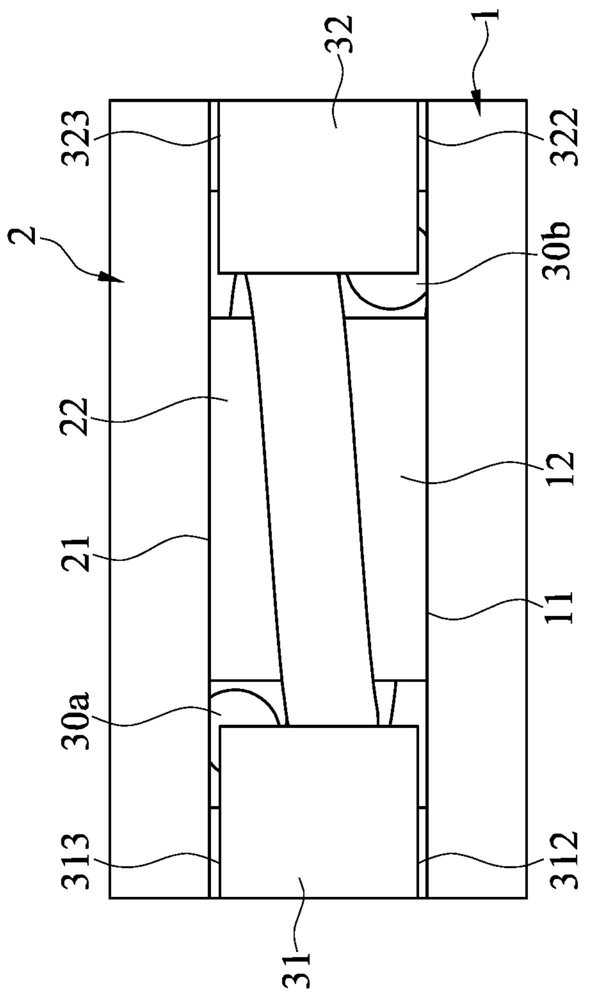
FIG. 4 is a first schematic bottom view of the inductor structure having a vertical coil with symmetrical pins in the first embodiment of the present disclosure.
Figure 5:
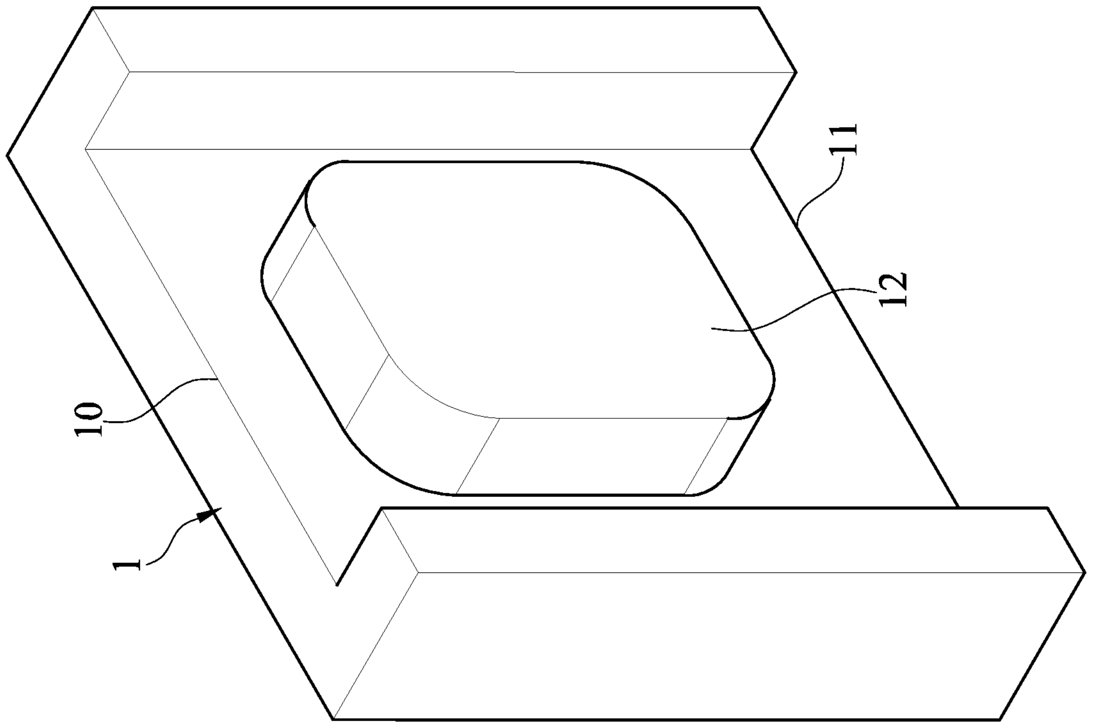
FIG. 5 is a schematic diagram of a first magnetic core body of the inductor structure having a vertical coil with symmetrical pins in the first embodiment of the present disclosure.
Figure 6:
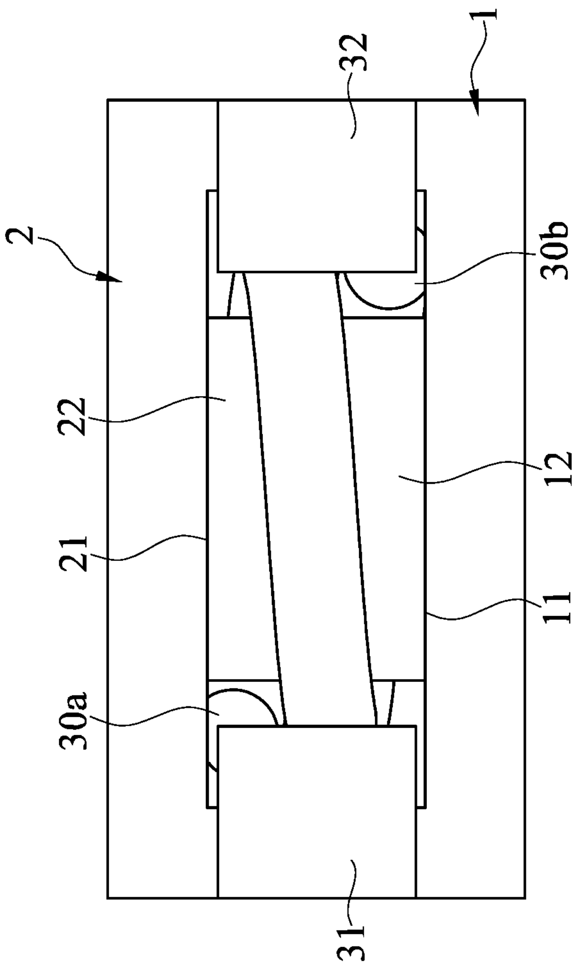
FIG. 6 is a second schematic bottom view of the inductor structure having a vertical coil with symmetrical pins in the first embodiment of the present disclosure.

Further, referring to FIGS. 1 to 5, in the inductor structure Z having a vertical coil with symmetrical pins in the present disclosure, the first magnetic core body 1 may have a first protrusion portion 12 corresponding to the accommodation space S, the second magnetic core body 2 may have a second protrusion portion 22 corresponding to the first protrusion portion 12, and the coil body 3 is sleeved on the first protrusion portion 12 and the second protrusion portion 22. For example, an inner wall surface of the first magnetic core body 1 corresponding to the accommodation space S protrudes towards the second magnetic core body 2 to form the first protrusion portion 12; and correspondingly, an inner wall surface of the second magnetic core body 2 corresponding to the accommodation space S also protrudes towards the first magnetic core body 1 to form the second protrusion portion 22. In addition, the first protrusion portion 12 and the second protrusion portion 22 have equal sectional areas; and a cross section of the first protrusion portion 12 is a circle (as shown in FIG. 3) or another geometrical shape (as shown in FIG. 5), but the present disclosure is not limited thereto. Moreover, referring to FIGS. 2 and 4, in the present disclosure, the first opening 11 of the first magnetic core body 1 may extend to the lateral sides of the first magnetic core body 1, the second opening 21 of the second magnetic core body 2 may extend to the lateral sides of the second magnetic core body 2, and the first pin part 31 and the second pin part 32 may be partially located in the first opening 11 and the second opening 21. Alternatively, referring to FIGS. 5 and 6, the first opening 11 of the first magnetic core body 1 does not extend to the lateral sides of the first magnetic core body 1 and the second opening 21 of the second magnetic core body 2 neither extend to the lateral sides of the second magnetic core body 2. Further, because the bottom portion 311 of the first pin part 31 and the bottom portion 321 of the second pin part 32 are thickened, the first pin part 31 and the second pin part 32 are partially exposed out of the first magnetic core body 1 and the second magnetic core body 2 (namely, out of the first opening 11 and the second opening 21).

Figure 7:
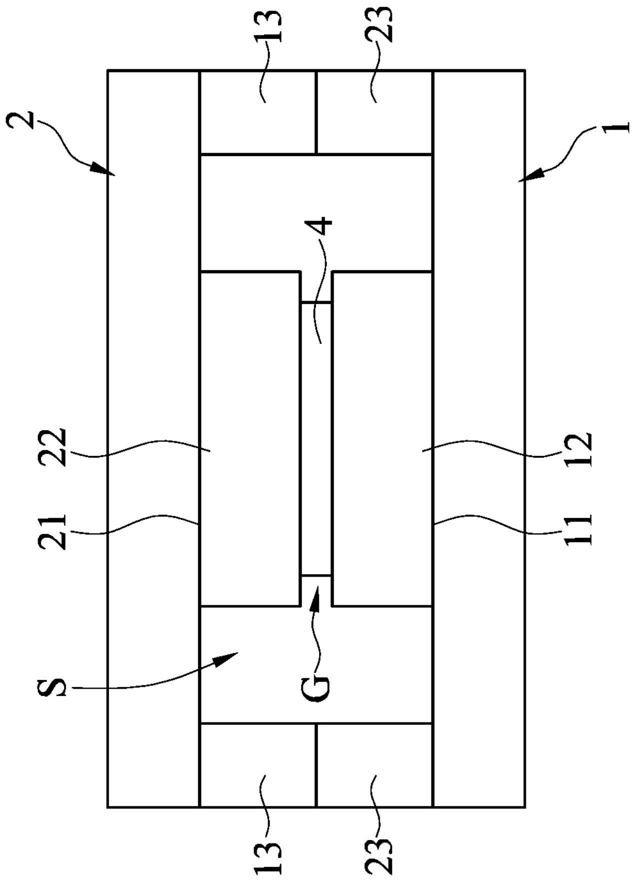
FIG. 7 is a first schematic bottom view of an inductor structure having a vertical coil with symmetrical pins in a second embodiment of the present disclosure.
Figure 8:
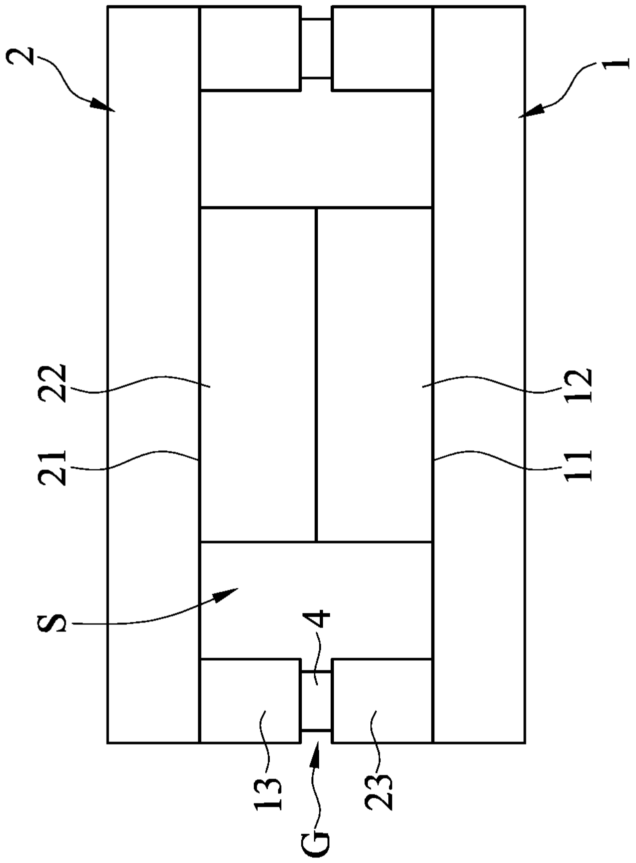
FIG. 8 is a second schematic bottom view of the inductor structure having a vertical coil with symmetrical pins in the second embodiment of the present disclosure.
Figure 9:
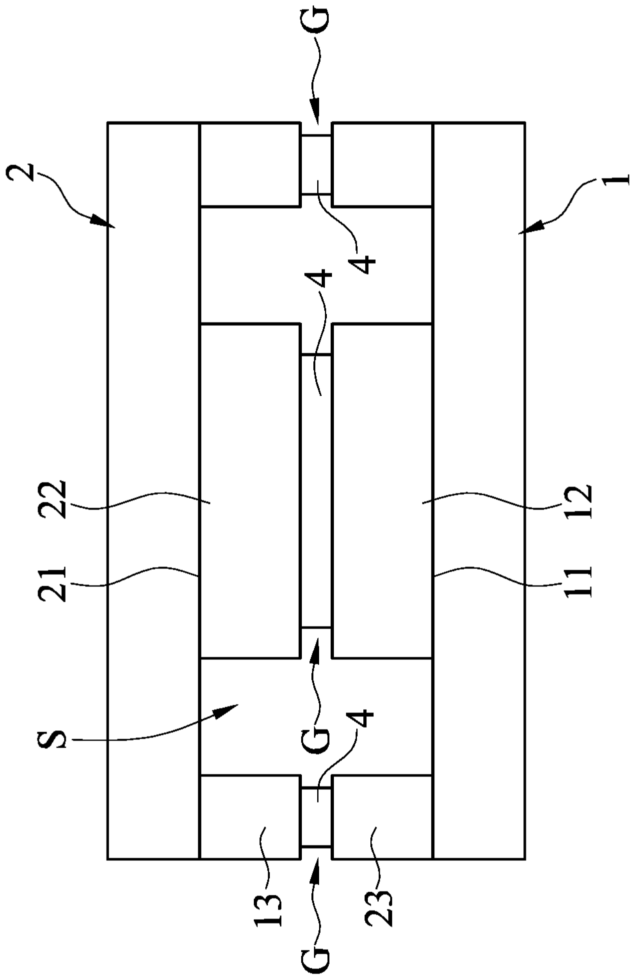
FIG. 9 is a third schematic bottom view of the inductor structure having a vertical coil with symmetrical pins in the second embodiment of the present disclosure.

Refer to FIGS. 7 to 9, which are a first schematic bottom view, a second schematic bottom view, and a third schematic bottom view of an inductor structure having a vertical coil with symmetrical pins in a second embodiment of the present disclosure; and refer to FIGS. 1 to 6 in combination. As shown in the figures, the inductor structure Z having a vertical coil with symmetrical pins in this embodiment is roughly similar to that in the foregoing first embodiment, so the details are not described herein again. This embodiment differs from the foregoing embodiment in that, a gap G exists between the first protrusion portion 12 and the second protrusion portion 22 in this embodiment, and the inductor structure Z further includes a spacer 4 located in the gap G. The spacer 4 may be made from a non-ferromagnetic material, including a mala sheet, kraft paper sheet, plastic sheet, or glass sheet; or made by mixing different non-ferromagnetic materials.

For example, referring to FIGS. 1 to 4 and FIG. 7, after assembly of the first magnetic core body 1 and the second magnetic core body 2, a gap G is formed between the first protrusion portion 12 and the second protrusion portion 22, and the spacer 4 is located in the gap G and in contact with the first protrusion portion 12 and the second protrusion portion 22. Therefore, the inductor structure Z having a vertical coil with symmetrical pins in the present disclosure controls an air gap between the first magnetic core body 1 and the second magnetic core body 2 by the disposition of the spacer 4, so as to achieve a required inductance. The size of the gap G and the thickness of the spacer 4 may be adjusted as required by a user or manufacturer.

Further, referring to FIG. 8, the first magnetic core body 1 of the present disclosure may have a plurality of first sidewalls 13 in opposite arrangement, and the second magnetic core body 2 may also have a plurality of second sidewalls 23 in opposite arrangement, where the first sidewalls 13 are corresponding to the second sidewalls 23 in a one-to-one manner. Therefore, the first protrusion portion 12 contact the second protrusion portion 22, a gap G is formed between each pair of corresponding first and second sidewalls 13 and 23, and the spacer 4 may be disposed in the gap G. Alternatively, referring to FIG. 9, in the present disclosure, there are gaps G between the first sidewalls 13 of the first magnetic core body 1 and the second sidewalls 23 of the second magnetic core body 2 that are corresponding in a one-to-one manner, a gap G also exists between the first protrusion portion 12 and the second protrusion portion 22, and the spacer 4 may be disposed in each gap G.

It should be noted that, the spacing of each gap G may be determined as required by the user or manufacturer, and no object may be placed in the gap G to form an air gap.

However, examples given in the foregoing embodiments merely show one of feasible embodiments and are not intended to limit the present disclosure.

One of advantageous effects of the present disclosure lies in that, practicality of the inductor structure Z having a vertical coil with symmetrical pins provided by the present disclosure can be improved by using the foregoing technical solution.

Further, in the inductor structure Z having a vertical coil with symmetrical pins provided by the present disclosure, by the foregoing technical solution, the two ends of the coil body 3 are pressed, bent, or subjected to other industrial processing techniques to separately extend towards a lateral side, to form an approximately L-shaped first pin part 31 and second pin part 32; and the first pin part 31 and the second pin part 32 face each other (that is, they are on the same straight line). Therefore, the inductor structure Z having a vertical coil with symmetrical pins provided by the present disclosure occupies a small surface area of a substrate and thus facilitates surface layout of the substrate (for example, a circuit board, but the present disclosure is not limited thereto) as compared with the existing horizontal inductor. Moreover, the inductor structure Z having a vertical coil with symmetrical pins in the present disclosure is easily mounted and disposed on the substrate as compared with the existing standing inductor.

The contents disclosed above are only preferred and feasible embodiments of the present disclosure, and are not intended to limit the scope of patent application of the present disclosure. Therefore, all equivalent technical changes made using the specification and drawings of the present disclosure all fall within the scope of the patent application for the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An inductor structure having a vertical coil with symmetrical pins, comprising:

a first magnetic core body;

a second magnetic core body, detachably connected to the first magnetic core body, wherein an accommodation space is defined between the second magnetic core body and the first magnetic core body; and a coil body, located in the accommodation space and comprising a main body part, a first pin part, and a second pin part, wherein the first pin part is connected to one end of the main body part; the second pin part is connected to the other end of the main body part; and the main body part, the first pin part, and the second pin part are integrally formed;

wherein the one end and the other end of main body part extend in the same direction and are misaligned, and the first pin part and the second pin part are symmetrically arranged and face each other.

2. The inductor structure having a vertical coil with symmetrical pins of claim 1, wherein the first magnetic core body has a first protrusion portion corresponding to the accommodation space, the second magnetic core body has a second protrusion portion corresponding to the first protrusion portion, and the coil body is sleeved on the first protrusion portion and the second protrusion portion.

3. The inductor structure having a vertical coil with symmetrical pins of claim 2, wherein the first protrusion portion and the second protrusion portion have equal sectional areas; and a cross section of the first protrusion portion is a circle or polygon.

4. The inductor structure having a vertical coil with symmetrical pins of claim 2, wherein a gap exists between the first protrusion portion and the second protrusion portion; and the inductor structure further comprises a spacer located in the gap.

5. The inductor structure having a vertical coil with symmetrical pins of claim 4, wherein the spacer is made from a non-ferromagnetic material, including a mala sheet, kraft paper sheet, plastic sheet, or glass sheet; or made by mixing different non-ferromagnetic materials.

6. The inductor structure having a vertical coil with symmetrical pins of claim 1, wherein the first pin part and the second pin part are L-shaped; the first magnetic core body and the second magnetic core body are made of ferrite or a soft magnetic material; and the coil body is a toroidal or flat coil.

7. The inductor structure having a vertical coil with symmetrical pins of claim 1, wherein the first magnetic core body is provided with a first notch communicating with the accommodation space at one end, and the second magnetic core body is provided with a second notch corresponding to the first notch at one end; the first magnetic core body is provided with a first opening communicating with the accommodation space at the other end, and the second magnetic core body is provided with a second opening corresponding to the first opening at the other end; and the first pin part and the second pin part are partially exposed out of the first opening and the second opening.

8. The inductor structure having a vertical coil with symmetrical pins of claim 7, wherein a top portion of the first pin part has a first position close to the first magnetic core body and a second position close to the second magnetic core body; a top portion of the second pin part has a third position close to the first magnetic core body and a fourth position close to the second magnetic core body; and the one end of the main body part is connected to the second position on the top portion of the first pin part, and the other end of the main body part is connected to the fourth position on the top portion of the second pin part.

9. The inductor structure having a vertical coil with symmetrical pins of claim 8, wherein a bottom portion of the first pin part and a bottom portion of the second pin part are exposed out of the first opening and the second opening.

* * * * *